United States Patent
Wang et al.

(10) Patent No.: US 8,803,942 B2
(45) Date of Patent: Aug. 12, 2014

(54) SESSION PROCESSING METHOD AND SYSTEM

(75) Inventors: Shaoxing Wang, Shenzhen (CN); Yong Ling, Shenzhen (CN); Jichao Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/257,883

(22) PCT Filed: Sep. 15, 2010

(86) PCT No.: PCT/CN2010/076954
§ 371 (c)(1),
(2), (4) Date: Jul. 17, 2012

(87) PCT Pub. No.: WO2011/103747
PCT Pub. Date: Sep. 1, 2011

(65) Prior Publication Data
US 2012/0274726 A1    Nov. 1, 2012

(30) Foreign Application Priority Data
Feb. 26, 2010  (CN) .......................... 2010 1 0122217

(51) Int. Cl.
| | | |
|---|---|---|
| H04N 7/15 | (2006.01) | |
| H04L 29/06 | (2006.01) | |
| H04W 76/00 | (2009.01) | |
| H04W 4/10 | (2009.01) | |
| H04N 7/14 | (2006.01) | |

(52) U.S. Cl.
CPC ............ *H04N 7/152* (2013.01); *H04L 65/4061* (2013.01); *H04W 76/005* (2013.01); *H04W 4/10* (2013.01); *H04L 65/403* (2013.01); *H04L 65/1069* (2013.01); *H04N 7/148* (2013.01)
USPC ..................................... 348/14.08; 348/14.02

(58) Field of Classification Search
USPC .......... 348/14.01, 14.02, 14.05, 14.08, 14.11; 455/458, 518
See application file for complete search history.

(56) References Cited

U.S. PATENT DOCUMENTS 6,750,896 B2 *   6/2004   McClure .................... 348/14.01
2006/0114847 A1 *   6/2006   Dssouli et al. ................ 370/261
(Continued)

FOREIGN PATENT DOCUMENTS

| CN | 101345845 A | 1/2009 |
|---|---|---|
| CN | 101610382 A | 12/2009 |

(Continued)

OTHER PUBLICATIONS

International Search Report on international application No. PCT/CN2010/076954, mailed on Dec. 23, 2010.

(Continued)

*Primary Examiner* — Binh Tieu
(74) *Attorney, Agent, or Firm* — Oppedahl Patent Law Firm LLC

(57) ABSTRACT

The disclosure discloses a session processing method, which includes: a wireless Access Terminal (AT) supporting wireless video sends a cluster user participation command to a conference control center, wherein the command includes an identifier of a cluster user which is invited to participate in a video conference; the conference control center sends an invitation to a cluster terminal corresponding to the identifier of the cluster user through a Push To Talk Dispatch Server (PDS); the cluster terminal which receives the invitation returns an Acknowledgement (ACK) response to the PDS when the cluster terminal agrees to participate in the video conference and establishes a link with the PDS; and session interaction between the AT and the cluster terminal is performed based on the link. The disclosure also discloses a session processing system. By adopting the method and the system according to the disclosure, a session between an AT supporting wireless video and a common cluster terminal in a wireless video conference system is realized.

12 Claims, 4 Drawing Sheets

(56) References Cited

U.S. PATENT DOCUMENTS

| | | | |
|---|---|---|---|
| 2006/0234744 A1* | 10/2006 | Sung et al. | 455/518 |
| 2007/0197234 A1* | 8/2007 | Gill et al. | 455/458 |
| 2008/0084470 A1 | 4/2008 | Hamilton | |
| 2009/0168984 A1 | 7/2009 | Kreiner | |
| 2010/0233993 A1* | 9/2010 | Maggenti et al. | 455/406 |
| 2012/0105571 A1 | 5/2012 | Li | |
| 2013/0271561 A1* | 10/2013 | Thapa | 348/14.08 |

FOREIGN PATENT DOCUMENTS

| | | |
|---|---|---|
| CN | 101610383 A | 12/2009 |
| CN | 101610385 A | 12/2009 |
| CN | 101616299 A | 12/2009 |
| CN | 101621658 A | 1/2010 |
| CN | 101778244 A | 7/2010 |
| CN | 101820523 A | 9/2010 |
| WO | 2006081726 A1 | 8/2006 |
| WO | 2006096023 A1 | 9/2006 |
| WO | 2008039077 A1 | 4/2008 |

OTHER PUBLICATIONS

English Translation of the Written Opinion of the International Search Authority in international application No. PCT/CN2010/076954, mailed on Dec. 23, 2010.

Supplementary European Search Report in European application No. 10846370.4, mailed on Apr. 3, 2014.

* cited by examiner

SESSION PROCESSING METHOD AND SYSTEM

TECHNICAL FIELD

The disclosure relates to the session technology in the wireless communications field, in particular to a session processing method and a session processing system.

BACKGROUND

With the extensive commercialization of the wireless broadband network, the wireless video function is known by users gradually. High-speed data transmission links of the wireless broadband networks provide a guarantee for a wireless Access Terminal (AT) to transmit large traffic data. The AT has a function of acquiring video data and video data and can be connected to a Packet Core Network (PCN) through a Radio Access Network (RAN) so as to access a wireless broadband network system.

A wireless video conference system is developed on the basis of the wireless broadband network system. The network structure of the wireless video conference system is shown as FIG. 1, wherein the AT establishes a link with a conference control centre through the RAN, the PCN, and an Internal Protocol (IP) network; and the link can transmit media data and control information of a wireless video conference bidirectionally, wherein the media data include a video stream and an audio stream. The AT has the capacity of acquiring the media data; data are transmitted between the AT and the RAN through an air interface (for example, the UM) protocol and are transmitted between the PCN and the conference control centre through a Transmission Control Protocol/Internet Protocol (TCP/IP) protocol; and the conference control centre has a function of receiving and distributing a media data stream and inviting the AT to attend and leave a video conference through an air interface signalling.

The above-mentioned wireless video conference system realizes the conference between the ATs supporting wireless video. However, with the continuous promotion of user experience, users sometimes hope that the AT supporting wireless video can make a session with a common cluster terminal so as to keep pace with more abundant conference requirement. A conventional cluster system is shown as FIG. 2, wherein the data is transmitted between cluster terminals through a Base Station (BS), a cluster dispatch client (for example, a Push To Talk Dispatch Client, which is called PTT DC or PDC for short), a cluster dispatch server (for example, a Push To Talk Dispatch Server, which is called PTT DS or PDS for short) and an IP network; and the cluster terminal accepts the dispatch of the PDS. At present, since the cluster terminal cannot analyze the video stream transmitted by the wireless video conference and the cluster terminal and the AT supporting wireless video are not directly positioned in the same network, the session between the AT supporting wireless video and the common cluster terminal cannot be realized.

SUMMARY

In view of this, the main object of the disclosure is to provide a session processing method and a session processing system for realizing the session between the AT supporting wireless video and the common cluster terminal in the wireless video conference system.

In order to achieve the object, the technical scheme of the disclosure is realized below.

The disclosure provides a session processing method, which includes:

sending a cluster user participation command to a conference control centre by a wireless Access Terminal (AT) supporting wireless video, wherein the command comprises an identifier of a cluster user which is invited to participate in a video conference;

sending, by the conference control centre, an invitation to a cluster terminal corresponding to the identifier of the cluster user through a PTT Dispatch Server (PDS);

returning by the cluster terminal which receives the invitation an Acknowledgement (ACK) response to the PDS when the cluster terminal agrees to participate in the video conference, and establishing by the cluster terminal a link with the PDS; and performing session interaction between the AT and the cluster terminal based on the link.

Wherein when the AT and the cluster terminal perform session interaction based on the link, session processing in a direction from the AT to the cluster terminal is as follows:

the AT sends multimedia data to the conference control centre through a Radio Access Network (RAN), a Packet Core Network (PCN) and an IP network in turn;

the conference control centre splits the multimedia data received into a video stream and an audio stream, and sends the audio stream to the PDS; and the PDS forwards the audio stream received to the cluster terminal in the video conference.

Wherein when the AT and the cluster terminal perform session interaction based on the link, session processing in a direction from the cluster terminal to the AT is as follows:

the cluster terminal sends audio data to the PDS;

when determining that the cluster terminal is in the video conference, the PDS sends the audio data received to the conference control centre and other cluster terminals in the video conference; and the conference control centre encapsulates the audio data received into an audio stream in a multimedia format and sends the audio stream to the AT in the video conference.

Wherein the sending a cluster user participation command to a conference control centre by an AT is:

encapsulating, by the AT, the identifier of the cluster user which is invited to participate in the video conference into video conference management information, and sending by the AT the cluster user participation command which includes the video conference management information to the conference control centre through the RAN, the PCN and the IP network in turn; and obtaining, by the conference control centre, the identifier of the cluster user by analyzing the video conference management information, after the AT sends the cluster user participation command to the conference control centre.

Wherein the method further includes:

when the cluster terminal which receives the invitation disagrees to participate in the video conference, returning, by the cluster terminal, a Negative Acknowledgement (NACK) response to the PDS; forwarding by the PDS the NACK response to the conference control centre; and sending by the conference control centre the NACK response to the AT through the IP network, the PCN and the PAN in turn.

The disclosure also provides a session processing system, which includes:

an Access Terminal (AT) supporting wireless video, a conference control centre, a PTT Dispatch Server (PDS) and a cluster terminal, wherein the AT is configured to send a cluster user participation command to the conference control centre, wherein the cluster user participation command comprises an identifier of a cluster user which is invited to participate in a video conference;

the conference control centre is configured to send an invitation to a cluster terminal corresponding to the identifier of the cluster user through the PDS;

the cluster terminal is configured to return an Acknowledgement (ACK) response to the PDS when the cluster terminal agrees to participate in the video conference, and establish a link with the PDS;

the PDS is configured to forward the invitation from the conference control centre to the cluster terminal, establish the link with the cluster terminal after receiving the ACK response from the cluster terminal, and return an ACK response to the conference control centre after establishing the link successfully; and the AT and the cluster terminal are also configured to perform session interaction based on the link.

Wherein the AT is further configured to send multimedia data generated by the AT itself in a session process to the conference control centre through a Radio Access Network (RAN), a Packet Core Network (PCN) and an IP network in turn;

correspondingly, the conference control centre is further configured to split the multimedia data received into a video stream and an audio stream, and send the audio stream to the PDS; and the PDS is further configured to forward the audio stream received to the cluster terminal in the video conference.

Wherein the cluster terminal is further configured to send audio data generated by the cluster terminal itself in the session process to the PDS;

correspondingly, the PDS is further configured to send the audio data received to the conference control centre and other cluster terminals in the video conference when determining that the cluster terminal is in the video conference; and the conference control centre is further configured to encapsulate the audio data received into an audio stream in a multimedia format and send the audio stream to the AT in the video conference.

Wherein the AT is further configured to encapsulate the identifier of the cluster user which is invited to participate in the video conference into video conference management information and send the cluster user participation command including the video conference management information to the conference control centre through the RAN, the PCN and the IP network in turn; and correspondingly, the conference control centre is further configured to analyze the video conference management information to obtain the identifier of the cluster user.

Wherein the cluster terminal is further configured to return a Negative Acknowledgement (NACK) response to the PDS when receiving the invitation but disagreeing to participate in the video conference;

correspondingly, the PDS is further configured to forward the NACK response to the conference control centre; and the conference control centre is further configured to send the NACK response to the AT through the IP network, the PCN and the PAN in turn.

In the session processing method and the session processing system provided by the disclosure, the AT supporting wireless video sends the cluster user participation command to the conference control centre, wherein the command includes the identifier of the cluster user which is invited to participate in the video conference; the conference control centre sends the invitation to the cluster terminal corresponding to the identifier of the cluster user through the PDS; the cluster terminal which receives the invitation returns the ACK response to the PDS when the cluster terminal agrees to participate in the video conference, and establishes a link with the PDS; and the session interaction is performed between the AT and the cluster terminal based on the link.

By applying the method and the system according to the disclosure, the session between the AT supporting wireless video and the common cluster terminal in the wireless video conference system is realized, so that the more abundant conference requirement is met; and the user experience is enhanced.

DETAILED DESCRIPTION

The technical scheme of the disclosure is further illustrated in detail with reference to drawings and specific embodiments.

Figure 1:
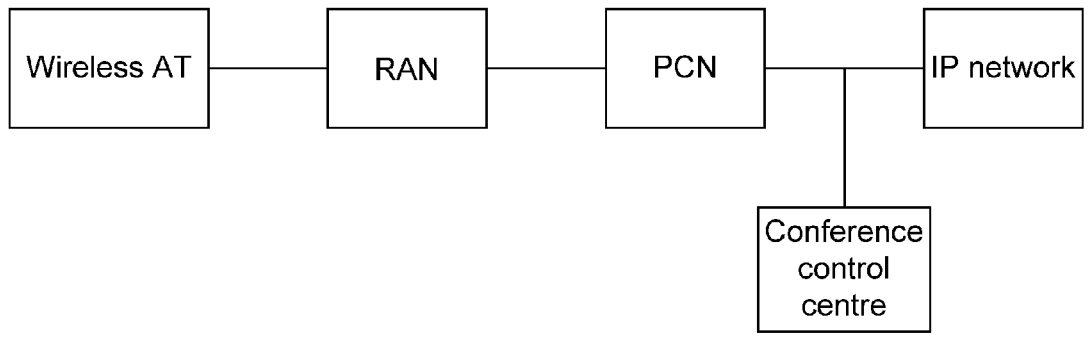
FIG. 1 shows a diagram of a network structure of a wireless video conference system in the related art.
Figure 2:
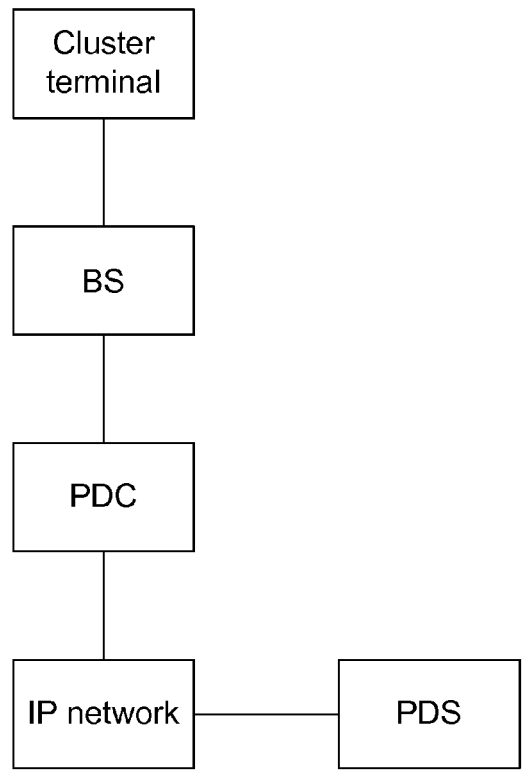
FIG. 2 shows a diagram of a network structure of a cluster system in the related art.
Figure 3:
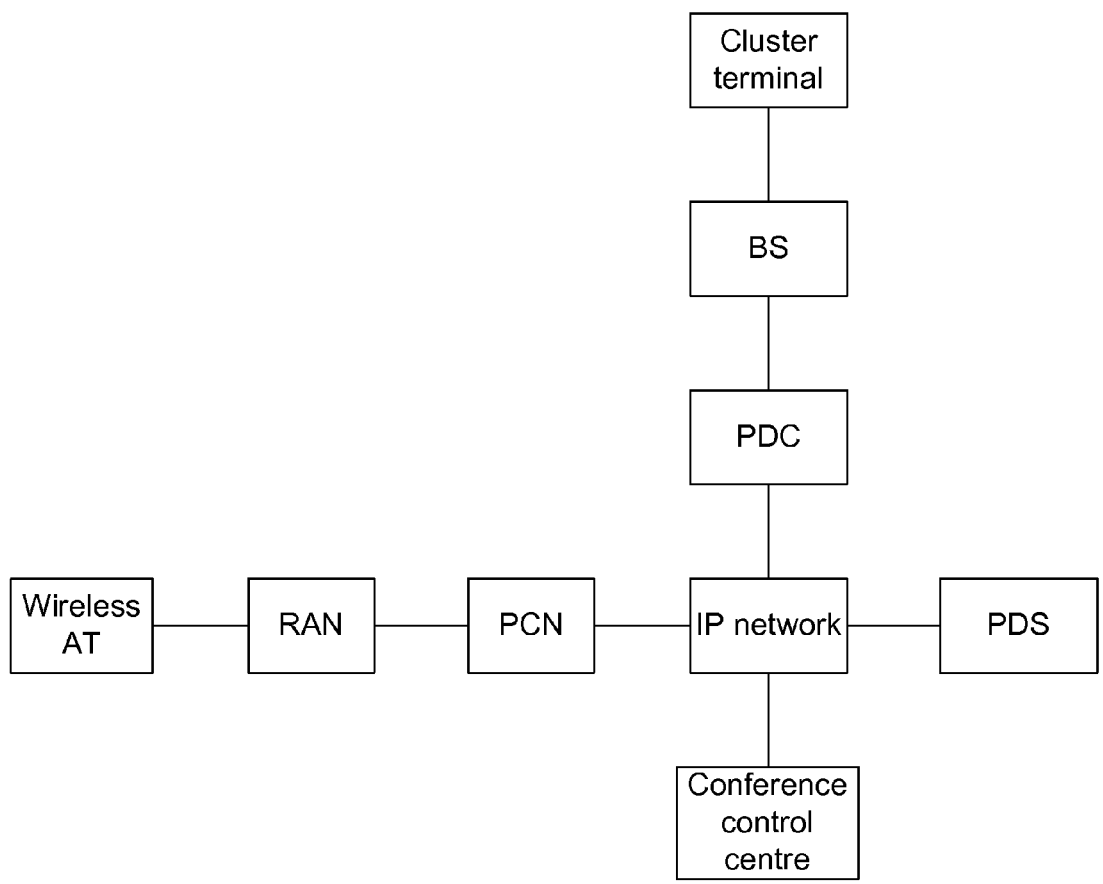
FIG. 3 shows a structural diagram of a session processing system.

In order to realize a session between an AT supporting wireless video and a common cluster terminal in a wireless video conference system, as shown in FIG. 3, a network architecture of a cluster system is added into the wireless video conference system in the session processing system provided by the disclosure. In the session processing system, an AT, a RAN, a PCN and a conference control centre, which are connected through the IP network, are composition of the wireless video conference system; and a cluster terminal, a BS, a PDC and a PDS, which are connected through the IP network, are compositions of the cluster system.

The AT is configured to encapsulate the identifier of the cluster user which is invited to participate in the video conference into video conference management information, and send the cluster user participation command which includes the video conference management information to the conference control centre through the RAN, the PCN and the IP network in turn.

The conference control centre is configured to obtain the identifier of the cluster user by analyzing the video conference management information, and sending an invitation to the cluster terminal corresponding to the identifier of the cluster user through the PDS.

The cluster terminal is configured to return an ACK response to the PDS when the cluster terminal receives the invitation and agrees to participate in the video conference and establish a link with the PDS.

The PDS is configured to forward the invitation from the conference control centre to the cluster terminal, establish a link with the cluster terminal after receiving the ACK response from the cluster terminal, and return an ACK response to the conference control centre after establishing the link successfully.

The AT and the cluster terminal are also configured to perform session interaction based on the link, which specifically includes the following two aspects:

1, when the AT sends the multimedia data to the conference control centre through the RAN, the PCN and the IP network in turn, the conference control centre splits the received multimedia data into a video stream and an audio stream, and sends the audio stream to the PDS; and the PDS forwards the audio stream received to the cluster terminal in the video conference.

2, when the cluster terminal sends audio data to the PDS, the PDS determines whether the cluster terminal is in the video conference; if the PDS determines that the cluster terminal belongs is in the video conference, the PDS sends the audio data received to the conference control centre and other cluster terminals in the video conference; and the conference control centre encapsulates the audio data received into the audio stream in a multimedia format, and sends the audio stream to the AT in the video conference.

The session processing method according to the disclosure is further illustrated in detail by combining the session processing system shown in FIG. 3.

Figure 4:
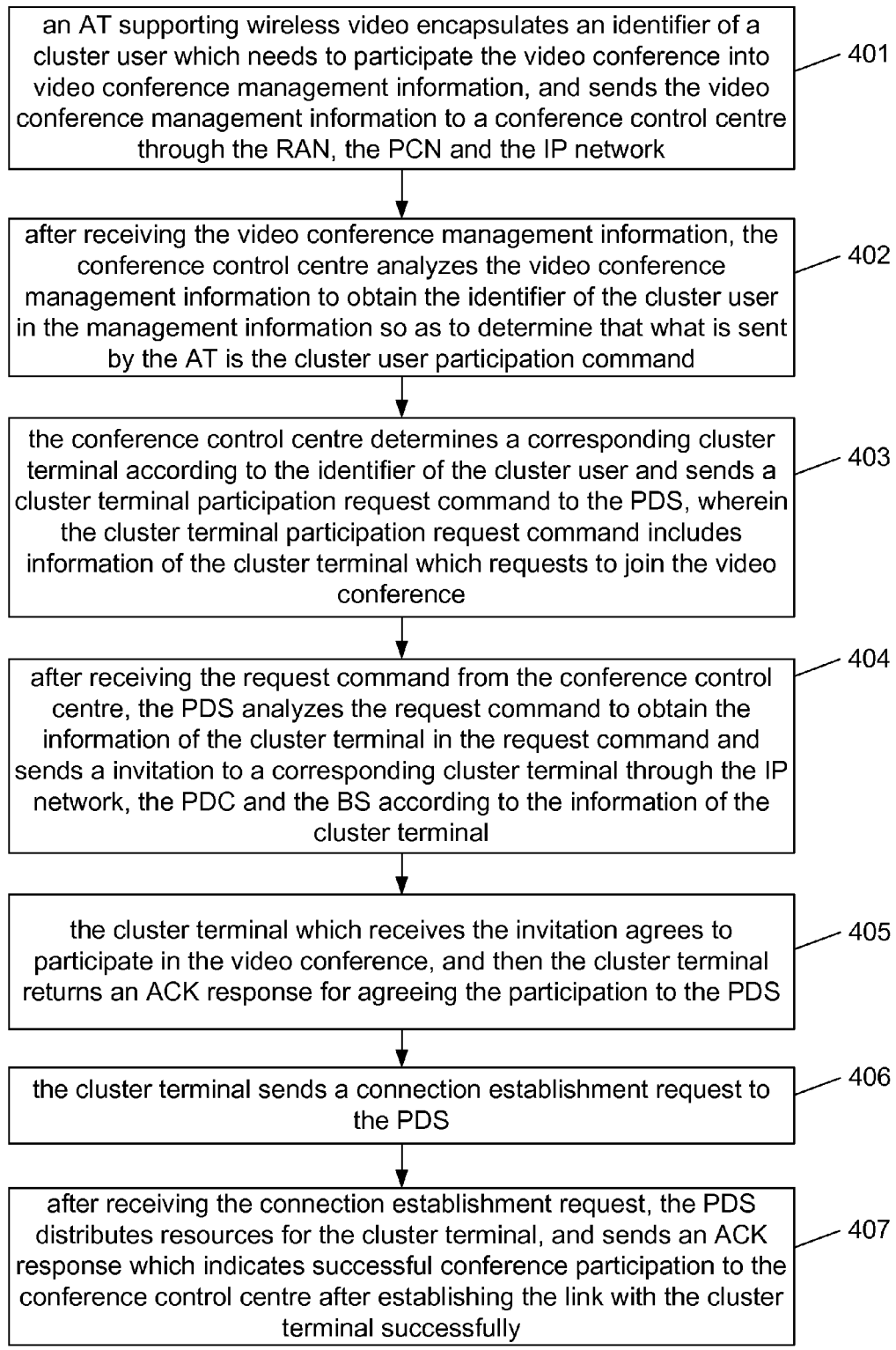
FIG. 4 shows a flow chart of inviting a cluster terminal to participate in a conference by the AT according to an embodiment of the disclosure.

At first, the FIG. 4 is a flow chart of inviting the cluster terminal to participate in the conference by the AT according to an embodiment of the disclosure, as shown the FIG. 4, the flow mainly includes the steps below.

Step 401, an AT supporting wireless video encapsulates an identifier of a cluster user which needs to participate the video conference into video conference management information, and sends the video conference management information to a conference control centre through the RAN, the PCN and the IP network.

Note that, the AT supporting wireless video must have an administration authority of adding a user into a conference which is convinced. The video conference management information can be sent to the conference control centre by a signalling or in other manners, for example, by adding a cluster user command. The identifier of the cluster user can be a number of the cluster user; however, the identifier of the cluster user is not limited to the number of the cluster user and can be expanded to other forms.

Step 402, after receiving the video conference management information, the conference control centre analyzes the video conference management information to obtain the identifier of the cluster user in the management information so as to determine that what is sent by the AT is the cluster user participation command.

Step 403, the conference control centre determines a corresponding cluster terminal according to the identifier of the cluster user and sends a cluster terminal participation request command to the PDS, wherein the cluster terminal participation request command includes information of the cluster terminal which requests to join the video conference.

Step 404, after receiving the request command from the conference control centre, the PDS analyzes the request command to obtain the information of the cluster terminal in the request command and sends a invitation to a corresponding cluster terminal through the IP network, the PDC and the BS according to the information of the cluster terminal so as to invite the cluster terminal to participate in the video conference.

Step 405, if the cluster terminal which receives the invitation agrees to participate in the video conference, the cluster terminal returns an ACK response for agreeing the participation to the PDS; and if the cluster terminal does not agree to participate in the video conference, the cluster terminal returns an NACK response for not agreeing the participation to the PDS.

Note that, if the cluster terminal which receives the invitation agrees to participate in the video conference, the subsequent steps 406-407 is performed continuously; if the cluster terminal does not agree to participate in the video conference, the cluster terminal returns a NACK response to the PDS, the PDS forwards the NACK response to the conference control centre, and the conference control centre sends the NACK response to the AT through the IP network, the PCN and the PAN in turn.

Step 406, the cluster terminal which agrees to participate in the video conference sends a connection establishment request to the PDS.

Step 407, after receiving the connection establishment request, the PDS distributes resources for the cluster terminal, and sends an ACK response which indicates successful conference participation to the conference control centre after establishing the link with the cluster terminal successfully. To this end, the cluster terminal participates in the video conference and bidirectional conference communication can be performed between the cluster terminal and the AT.

Figure 5:
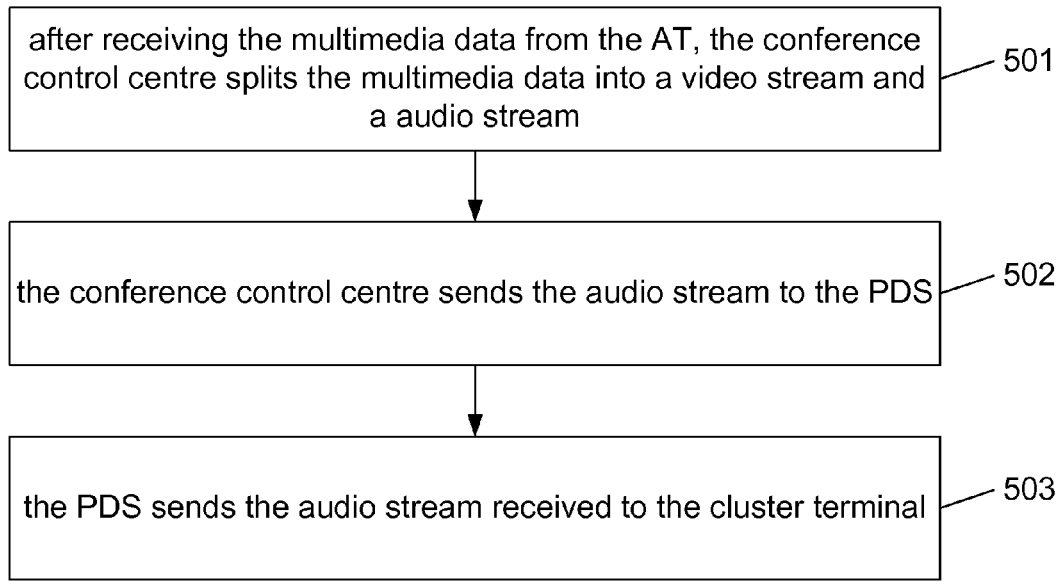
FIG. 5 shows a first flow chart of performing session interaction between the AT and the cluster terminal according to an embodiment of the disclosure.

In addition, FIG. 5 shows a processing flow in a direction from the AT to the cluster terminal during session interaction, as shown in FIG. 5, which mainly includes the steps below.

Step 501, the AT sends multimedia data to the conference control centre through the RAN, the PCN and the IP network in turn, and after receiving the multimedia data from the AT, the conference control centre splits the multimedia data into a video stream and a audio stream.

Step 502, the conference control centre sends the audio stream to the PDS.

Step 503, the PDS sends the audio stream received to the cluster terminal.

Note that, after receiving the multimedia data from the AT, the conference control centre does not need to perform split, and the conference control centre forwards the multimedia data received to other ATs directly when forwarding the multimedia data to the other ATs in the video conference; and the conference control centre needs to perform the split and send the audio stream to the PDS only when forwarding the multimedia data to the cluster terminal in the video conference, and the PDS forwards the audio stream to the cluster terminal.

Figure 6:
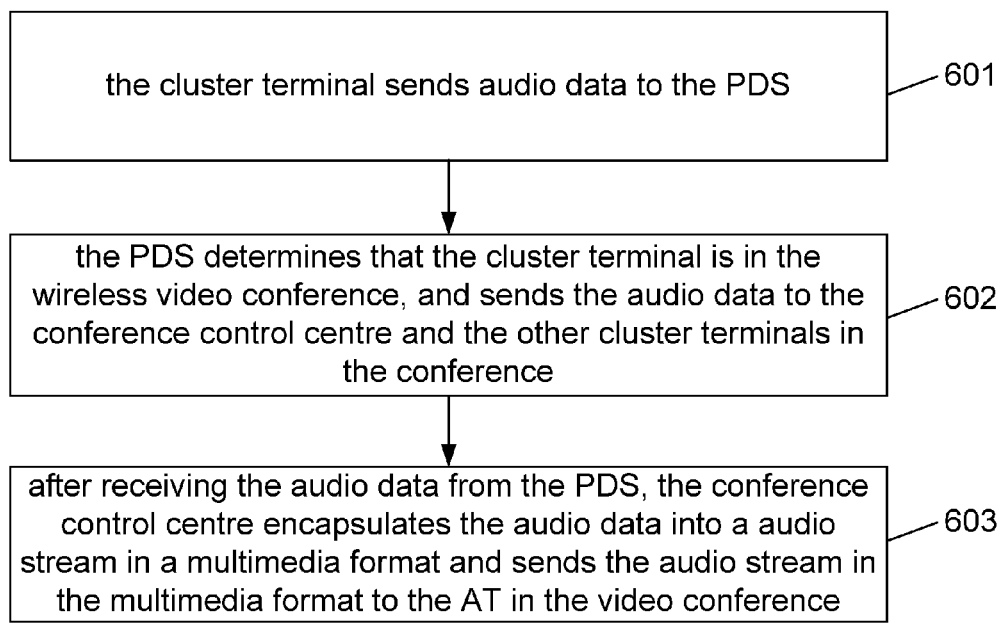
FIG. 6 shows a second flow chart of performing session interaction between the AT and the cluster terminal according to an embodiment of the disclosure.

FIG. 6 shows a processing flow in a direction from the cluster terminal to the AT during session interaction, as shown in FIG. 6, which mainly includes the steps below.

Step 601, the cluster terminal sends acquired audio data to the PDS.

Step 602, the PDS determines whether the cluster terminal is in the wireless video conference according to cluster terminal information stored in the PDS; and if so, then the PDS sends the audio data to the conference control centre and other cluster terminals in the conference.

Step 603, after receiving the audio data from the PDS, the conference control centre encapsulates the audio data into a audio stream in a multimedia format and sends the audio stream in the multimedia format to the AT in the video conference.

Note that, if the PDS determines that the cluster terminal which sends the audio data is not in the wireless video conference, then the PDS refuses to forward the audio data.

In conclusion, by applying the session processing method and the session processing system according to the disclosure, the session between the AT supporting wireless video and the common cluster terminal in the wireless video conference system is realized; the abundant conference requirement is met; and the user experience is enhanced.

All those described above are only preferred embodiments of the disclosure, and are not intended to limit the protection scope of the disclosure.

The invention claimed is:

1. A session processing method, comprising:
sending a cluster user participation command to a conference control centre by a wireless Access Terminal (AT) supporting wireless video, wherein the command comprises an identifier of a cluster user which is invited to participate in a video conference, and the AT has an administration authority of adding a user into the conference which is convinced;
sending, by the conference control centre, an invitation to a cluster terminal corresponding to the identifier of the cluster user through a Push To Talk Dispatch Server (PDS);
returning by the cluster terminal which receives the invitation an Acknowledgement (ACK) response to the PDS when the cluster terminal agrees to participate in the video conference, and establishing by the cluster terminal a link with the PDS; and
performing session interaction between the AT and the cluster terminal based on the link;
the method further comprising: returning by the cluster terminal which receives the invitation a Negative Acknowledgement (NACK) response to the PDS when the cluster terminal disagrees to participate in the video conference; forwarding by the PDS the NACK response to the conference control centre; and sending by the conference control centre the NACK response to the AT through the IP network, the PCN and the RAN in turn.

2. The session processing method according to claim 1, wherein when the AT and the cluster terminal perform session interaction based on the link, session processing in a direction from the AT to the cluster terminal is as follows:
the AT sends multimedia data to the conference control centre through a Radio Access Network (RAN), a Packet Core Network (PCN) and an Internet Protocol (IP) network in turn;
the conference control centre splits the multimedia data received into a video stream and an audio stream, and sends the audio stream to the PDS; and
the PDS forwards the audio stream received to the cluster terminal in the video conference.

3. The session processing method according to claim 1, wherein when the AT and the cluster terminal perform session interaction based on the link, session processing in a direction from the cluster terminal to the AT is as follows:
the cluster terminal sends audio data to the PDS;
when determining that the cluster terminal is in the video conference, the PDS sends the audio data received to the conference control centre and other cluster terminals in the video conference; and
the conference control centre encapsulates the audio data received into an audio stream in a multimedia format and sends the audio stream to the AT in the video conference.

4. The session processing method according to claim 3, wherein the sending a cluster user participation command to a conference control centre by an AT is:
encapsulating, by the AT, the identifier of the cluster user which is invited to participate in the video conference into video conference management information, and sending by the AT the cluster user participation command which includes the video conference management information to the conference control centre through the RAN, the PCN and the IP network in turn; and
obtaining, by the conference control centre, the identifier of the cluster user by analyzing the video conference management information, after the AT sends the cluster user participation command to the conference control centre.

5. The session processing method according to claim 1, wherein the sending a cluster user participation command to a conference control centre by an AT is:
encapsulating, by the AT, the identifier of the cluster user which is invited to participate in the video conference into video conference management information, and sending by the AT the cluster user participation command which includes the video conference management information to the conference control centre through the RAN, the PCN and the IP network in turn; and
obtaining, by the conference control centre, the identifier of the cluster user by analyzing the video conference management information, after the AT sends the cluster user participation command to the conference control centre.

6. The session processing method according to claim 2, wherein the sending a cluster user participation command to a conference control centre by an AT is:
encapsulating, by the AT, the identifier of the cluster user which is invited to participate in the video conference into video conference management information, and sending by the AT the cluster user participation command which includes the video conference management information to the conference control centre through the RAN, the PCN and the IP network in turn; and
obtaining, by the conference control centre, the identifier of the cluster user by analyzing the video conference management information, after the AT sends the cluster user participation command to the conference control centre.

7. A session processing system, comprising: an Access Terminal (AT) supporting wireless video, a conference control centre, a Push To Talk Dispatch Server (PDS) and a cluster terminal, wherein
the AT is configured to send a cluster user participation command to the conference control centre, wherein the cluster user participation command comprises an identifier of a cluster user which is invited to participate in a video conference, and the AT has an administration authority of adding a user into the conference which is convinced;
the conference control centre is configured to send an invitation to a cluster terminal corresponding to the identifier of the cluster user through the PDS;
the cluster terminal is configured to return an Acknowledgement (ACK) response to the PDS when the cluster terminal agrees to participate in the video conference, and establish a link with the PDS;
the PDS is configured to forward the invitation from the conference control centre to the cluster terminal, establish the link with the cluster terminal after receiving the ACK response from the cluster terminal, and return an ACK response to the conference control centre after establishing the link successfully; and
the AT and the cluster terminal are also configured to perform session interaction based on the link;
wherein the cluster terminal is further configured to return a Negative Acknowledgement (NACK) response to the PDS when receiving the invitation but disagreeing to participate in the video conference;

corresponingly, the PDS is further configured to forward the NACK response to the conference control centre; and the conference control centre is further configured to send the NACK response to the AT through the IP network, the PCN and the RAN in turn.

8. The session processing system according to claim 7, wherein the AT is further configured to send multimedia data generated by the AT itself in a session process to the conference control centre through a Radio Access Network (RAN), a Packet Core Network (PCN) and an IP network in turn;

correspondingly, the conference control centre is further configured to split the multimedia data received into a video stream and an audio stream, and send the audio stream to the PDS; and the PDS is further configured to forward the audio stream received to the cluster terminal in the video conference.

9. The session processing system according to claim 8, wherein the AT is further configured to encapsulate the identifier of the cluster user which is invited to participate in the video conference into video conference management information and send the cluster user participation command including the video conference management information to the conference control centre through the RAN, the PCN and the IP network in turn; and correspondingly, the conference control centre is further configured to analyze the video conference management information to obtain the identifier of the cluster user.

10. The session processing system according to claim 7, wherein the cluster terminal is further configured to send audio data generated by the cluster terminal itself in the session process to the PDS;

correspondingly, the PDS is further configured to send the audio data received to the conference control centre and other cluster terminals in the video conference when determining that the cluster terminal is in the video conference; and the conference control centre is further configured to encapsulate the audio data received into an audio stream in a multimedia format and send the audio stream to the AT in the video conference.

11. The session processing system according to claim 10, wherein the AT is further configured to encapsulate the identifier of the cluster user which is invited to participate in the video conference into video conference management information and send the cluster user participation command including the video conference management information to the conference control centre through the RAN, the PCN and the IP network in turn; and correspondingly, the conference control centre is further configured to analyze the video conference management information to obtain the identifier of the cluster user.

12. The session processing system according to claim 7, wherein the AT is further configured to encapsulate the identifier of the cluster user which is invited to participate in the video conference into video conference management information and send the cluster user participation command including the video conference management information to the conference control centre through the RAN, the PCN and the IP network in turn; and correspondingly, the conference control centre is further configured to analyze the video conference management information to obtain the identifier of the cluster user.

* * * * *